March 20, 1956  C. J. STONE  2,739,095
METHOD OF MANUFACTURING VENEER
PANELS OF FLITCH MATERIAL
Filed May 25, 1950  2 Sheets-Sheet 1

INVENTOR.
Cecil J. Stone,
BY Victor J. Evans & Co.
ATTORNEYS

March 20, 1956  
C. J. STONE  
2,739,095  
METHOD OF MANUFACTURING VENEER  
PANELS OF FLITCH MATERIAL  
Filed May 25, 1950  
2 Sheets-Sheet 2
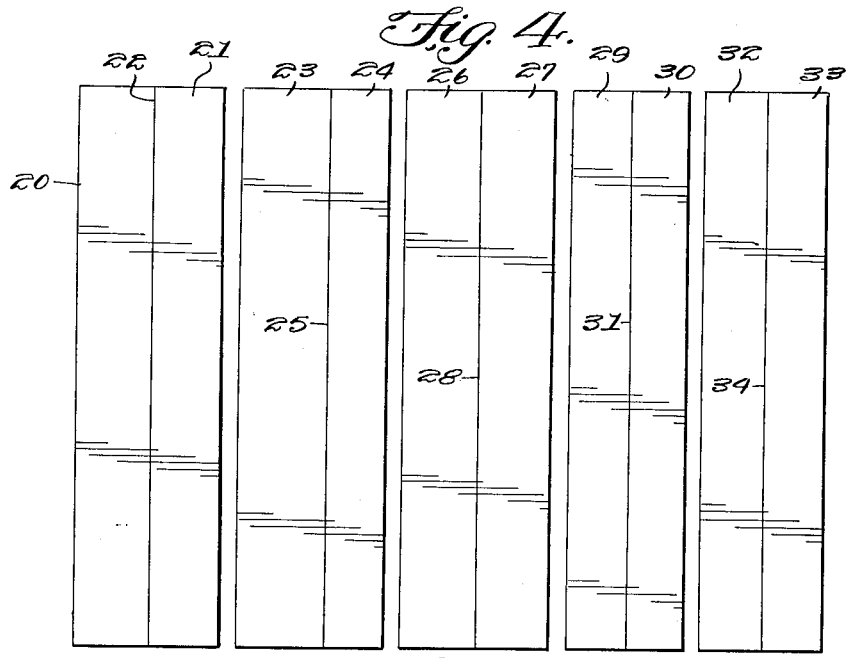
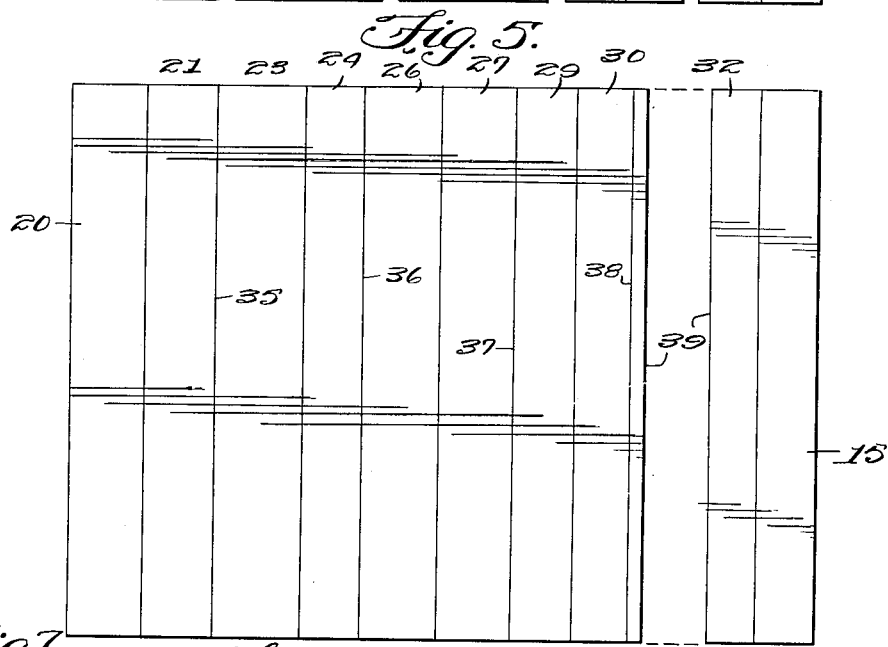
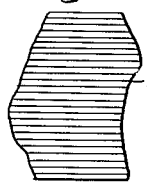
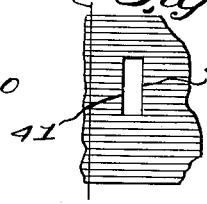
INVENTOR.  
Cecil J. Stone,  
BY Victor J. Evans & Co.  
ATTORNEYS

United States Patent Office 2,739,095
Patented Mar. 20, 1956

2,739,095

METHOD OF MANUFACTURING VENEER PANELS OF FLITCH MATERIAL

Cecil J. Stone, Bristol, Tenn.

Application May 25, 1950, Serial No. 164,099

5 Claims. (Cl. 154—116)

This invention relates to improvements in the conventional method of edge joining panels of veneer, lumber cores and other wood dimension products wherein the overage or strip clipped or cut from a sheet of veneer or piece of wood material in sizing is passed back to the operator to be joined to the next piece of stock in edge joining the next sheet of material being edge joined.

The purpose of this invention is to provide a means for utilizing all available material by eliminating extra trim waste clipped or otherwise cut from each sheet of veneer or piece of wood material to be edge joined.

The edge joining of strips of veneer is not new and has been carried out in various ways, such as by the use of gummed tape, by mechanical fasteners such as soft metal staples, and by edge gluing. The edge gluing of the veneer strips is the most desirable method of securing them together as it eliminates the use of undesirable superficial means such as staples or tape.

In accordance with present practice in veneer plants a sheet of veneer stock coming in a continuous strip from a log in a lathe is cut transversely of the sheet and lengthwise of the grain of the wood to form panels. If no defects are present in the sheet it is cut into panels of a predetermined correct width. However there are usually numerous defective portions to be cut out of the sheet and the cutting out of these defective portions results in the production of a large number of narrow pieces which heretofore have been edge joined together to form the necessary and desired width with the sizing or overage strip included which overage or sizing strip has usually been disposed of as waste.

Furthermore in sizing these edge joined sheets of veneer it is often necessary to trim the sheet longitudinally to size and the part trimmed from the sheet is waste stock. With this thought in mind this invention contemplates an improved method of manufacturing edge joined veneers, lumber cores and other wood dimension products wherein the strip clipped or sawed from one edge joined sheet of material is used to start another sheet or used at some point in another sheet whereby the waste material is continuously utilized.

The object of this invention is, therefore, to provide an improved method of manufacturing edge joined veneer, lumber cores and other wood dimension products whereby substantially all waste is eliminated.

Another object of the invention is to provide improvements in a method of forming veneer sheets edge joined from veneer flitch stock eliminating substantially all waste that may be accomplished with machines now in use.

Another object of the invention is to provide a method of maintaining the figure matching in forming veneer sheets edge joined from veneer flitch stock whereby the portion trimmed from one edge joined sheet of figure matched veneer is used to start the next edge joined or figure matched veneer.

A further object of this invention is to provide an improved method of utilizing waste material trimmed from edge joined veneer stock which is comparatively simple and economical.

With these and other objects and advantages in view the invention embodies a table having an edge joining or splicing machine and also a clipper or rip saw incorporated therein with means whereby operators pass the material from the edge joining or splicer machine to the clipper or saw and also pass the strips of material trimmed from the sheet of edge joined stock back to an operator whereby a strip trimmed from one edge glued sheet is incorporated in another sheet.

Other features and advantages of the invention will appear from the following description taken in connection with the drawings wherein:

Figure 4 is a plan view illustrating a method of joining slit strips or edge joining the strips to form a sheet of material.

Figure 5 is a similar view showing the remaining edges joined together and with an excess strip clipped or sawed from the sheet. This figure illustrates the method of maintaining the matching of grain figure of the excess strip to the next sheet being edge joined.

Figure 7 is a detail similar to that shown in Figure 1 illustrating odd shaped flitch stock.

Figure 8 is a similar detail illustrating spaces where defects in parts of flitch stock are removed whereby each part sheet clipped to remove the defect is retained in the flitch stock as it was originally.

Figure 9 is a similar view showing the flitch squared on the opposite side.

Figure 1:
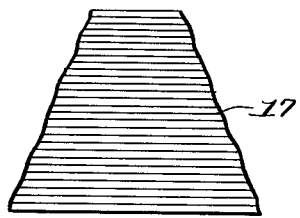
Figure 1 is a view illustrating an average flitch of veneer.

Referring now to the drawings wherein like reference characters denote corresponding parts the improved method of sizing and manufacturing edged joined veneer, lumber cores and other wood dimension products includes a table 10, a splicer or edge joining machine 11 and a clipper or rip saw 12.

In the design shown the table is rectangular shaped and one side is provided with an opening 13 for the operator of the splicer or edge joining machine and another opening 14 is provided for an operator to forward sheets or panels of material from the machine 11 to the clipper or rip saw 12 and this same operator sends a strip 15 of excess material back to the operator in the opening 13. The table 10 may be of any suitable size or shape and as many operators as may be desired may be used. The table is provided with a guide 16 and, or, a table rule so that the material is cut to the desired width. As many operators as may be desired may be used in combination with the edge gluing or splicer machine and also with the clipper or rip saw.

As illustrated in Figure 1 the average flitch stock is in sheets or strips of different widths with the width of the sheets or strips increasing toward the lower part of the pile stack. The sheets or strips are arranged in a staggered stack and by squaring up the sheets, which are indicated by the numeral 17 and clipping the edges on the line 18 shown in Figure 2, and then on the line 19 shown in Figure 3 both edges of the sheets or strips of the stack are clipped so that the edges are perpendicular to the side surfaces.

In using rotary veneers, and other veneers not in flitches, lumber and other wood products, where no match is necessary or obtainable the sheets or boards are cut random width to whatever width they will make.

With the sheets or boards as noted above the edges are joined together either by edge gluing machines or tapeless splicers, or by taping together on a taping machine or the like. The full width of each sheet is used regardless of the width of stock to be dimensioned therefrom.

In the conventional manner of edge joining veneer the strips are joined together one after the other without regard to the matching of the material whereas in this method the strips are matched and the strips are edge joined forming matched pairs thus facilitating the edge joining of the sheets or strips to form a panel, as illustrated in Figure 4 with the strips 20 and 21 edge joined on the line 22, the strips 23 and 24 joined on the line 25, the strips 26 and 27 joined on the line 28, the strips 29 and 30 joined on the line 31 and the strips 32 and 33 joined on the line 34.

The pairs of matched strips are then joined together to form panels, as illustrated in Figure 5 with the strips 21 and 23 joined on the line 35, the strips 24 and 26 joined on the line 36, the strips 27 and 29 joined on the line 37, the strips 30 and 32 joined on the line 38 to form sheets, and with as many additional pairs of matched strips similarly edge joined thereto as may be desired.

With the matched strips edge joined to form a sheet of material as illustrated in Figure 5 the sheet passes from the machine 11 to machine 12 whereby the strip 15 of excess material is clipped or cut from the edge of the material, being cut on the line 39. The position of the clipper or saw may be adjusted whereby the sheets of material may be trimmed to any suitable width.

Figure 2:
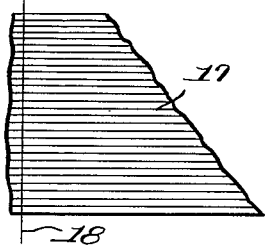
Figure 2 is a similar view showing the veneer sheets squared or otherwise positioned for clipping on one edge.
Figure 3:
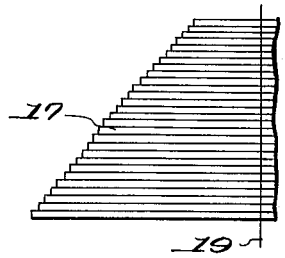
Figure 3 is a similar view illustrating the opposite edges of the flitch stock square for clipping with the edges formerly clipped in staggered relation.
Figure 6:
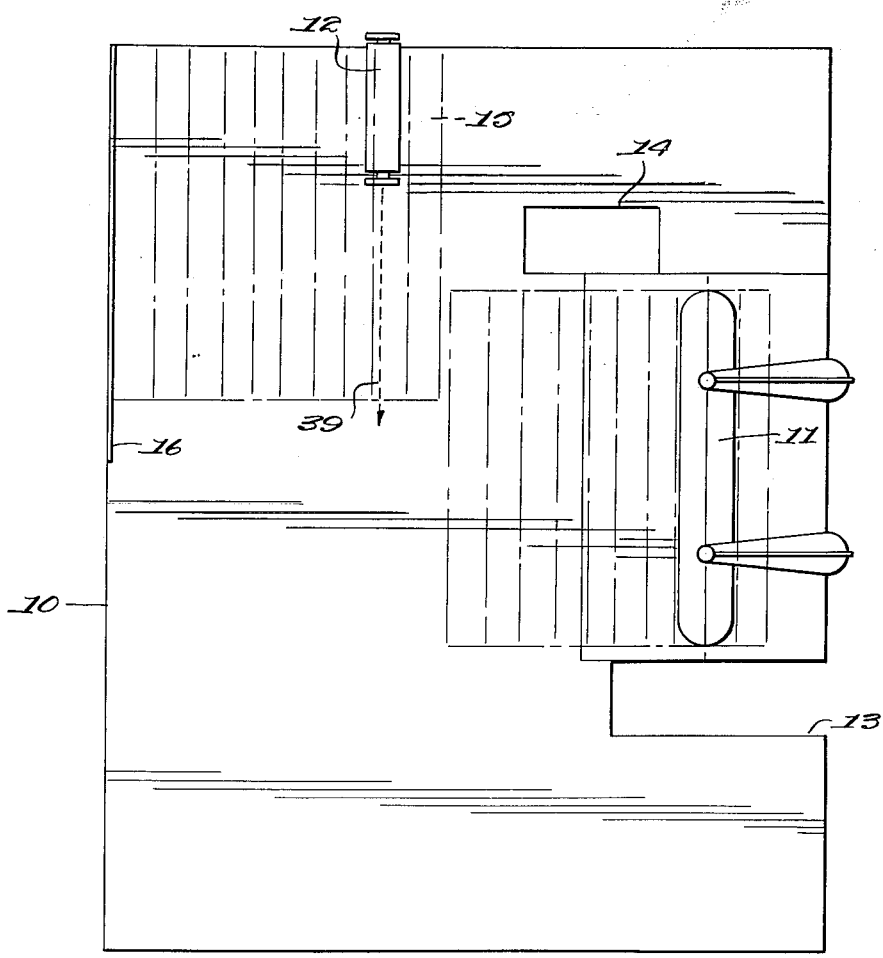
Figure 6 is a plan view of a table illustrating the relative positions of the edge joining machine or splicer, clipper or rip saw and the operators.

As illustrated in Figures 7 and 8 the sheet 40 of veneer may be of random widths, and as illustrated in Figures 2 and 3 the sheets are squared first on one edge and then on the other and sheets having defects in them are cut on the lines 41 and 42 with the remaining parts of the sheet retained in the flitch as it was originally and with the outer edges of these sheets and also of the remaining sheets squared and trimmed on the lines 43 and 44.

By this method a flitch of veneer of any shape is utilized and defects occurring in the flitch are clipped out by removing portions of the flitch in which the defects are found.

It will be understood that modifications may be made in the design and arrangement of the parts and whereby the method may be employed for manufacturing edge joined veneer sheets, wood cores and other wood dimension products without departing from the spirit of the invention.

What is claimed is:

1. The method of forming veneer panels from flitch material which comprises trimming a stack of flitch material to staggered width sheets, trimming the edges first on one side of the stack, positioning said sheets with the opposite edges substantially aligned, trimming said opposite edges of the sheets, gluing meeting edges of adjoining pairs of said flitch sheets together and gluing the formerly meeting edges of formerly adjoining sheets of said pairs forming a continuous panel.

2. The method as described in claim 1, wherein excess material is cut from one edge of said panel and used in forming another panel.

3. The method as described in claim 1, wherein defective parts of the flitch sheets are removed and the sheets from which the defective parts are removed are retained in the said stack.

4. The method of manufacturing veneer from flitch material including sheets of uneven widths which comprises arranging sheets of flitch material in stacks and cutting through the sheets at one side of the stacks with the sheets substantially alined on the side on which they are cut to provide edges of each sheet perpendicular to the side surfaces, sliding the sheets over until the edges on the opposite sides thereof are substantially alined, and cutting the sheets in the stacks with the edges opposite to the edges cut in the former step perpndicular to the side surfaces of the sheets thereby providing a stack of sheets of veneer with the sheets of different width.

5. The method as in claim 4, including the added step of trimming excess material from said sheets and utilizing the trimmed excess material for forming a portion of another sheet of veneer.

References Cited in the file of this patent

UNITED STATES PATENTS

| | | |
|---|---|---|
| 947,001 | Kertscher | Jan. 18, 1910 |
| 1,118,116 | Elliot | Nov. 24, 1914 |
| 1,702,185 | Weber | Feb. 12, 1929 |
| 1,944,282 | Snyder | Jan. 23, 1934 |
| 2,242,179 | Gustin | May 13, 1941 |
| 2,261,497 | Hill | Nov. 4, 1941 |
| 2,316,111 | Stamm | Apr. 6, 1943 |
| 2,323,105 | Welch | June 29, 1943 |
| 2,453,185 | Bilhuber | Nov. 9, 1948 |
| 2,578,781 | Brundige | Dec. 18, 1951 |